United States Patent [19]
Blankenship

[11] 3,812,822
[45] May 28, 1974

[54] POULTRY HANDLING SYSTEM
[76] Inventor: Milton O. Blankenship, Canton, Ga.
[22] Filed: June 6, 1972
[21] Appl. No.: 260,308

Related U.S. Application Data
[62] Division of Ser. No. 107,771, Jan. 19, 1971.

[52] U.S. Cl. ............................................... 119/17
[51] Int. Cl. ............................................. A01k 31/06
[58] Field of Search ............................... 119/17, 12

[56] References Cited
UNITED STATES PATENTS

| | | | |
|---|---|---|---|
| 3,621,818 | 11/1971 | Johnston et al. | 119/17 |
| 3,633,963 | 1/1972 | Haynes | 119/12 |
| 3,695,232 | 10/1972 | Frank | 119/17 |

*Primary Examiner*—Hugh R. Chamblee
*Attorney, Agent, or Firm*—Newton, Hopkins & Ormsby

[57] ABSTRACT

A receiving station having an upwardly open operable conveyor surface for conveying poultry to be processed from one location along a predetermined path to a second location is provided with an adjustable support platform means movable between operable and inoperable positions for effecting a transfer of poultry by gravity from a container means onto the conveyor surface in response to the platform being moved to the operable position. Padded guide means is provided on an opposite lateral side edge of the conveyor means from the adjustable platform means for absorbing the impact of poultry deposited thereon and for effecting a guided movement of the deposited poultry onto the conveyor means. The conveyor means is operable for effecting a transfer of the poultry deposited thereon from a first location adjacent the operable platform to a second location adjacent suspension means used for conveying poultry through a processing operation. Special container means is provided for transporting poultry from poultry growing facilities to the receiving station. The container means is detailed to be supported on the platform means and for movement to the angular oriented operable position for effecting a transfer of poultry by gravity from within the container means onto the conveyor and padded guide means.

3 Claims, 9 Drawing Figures

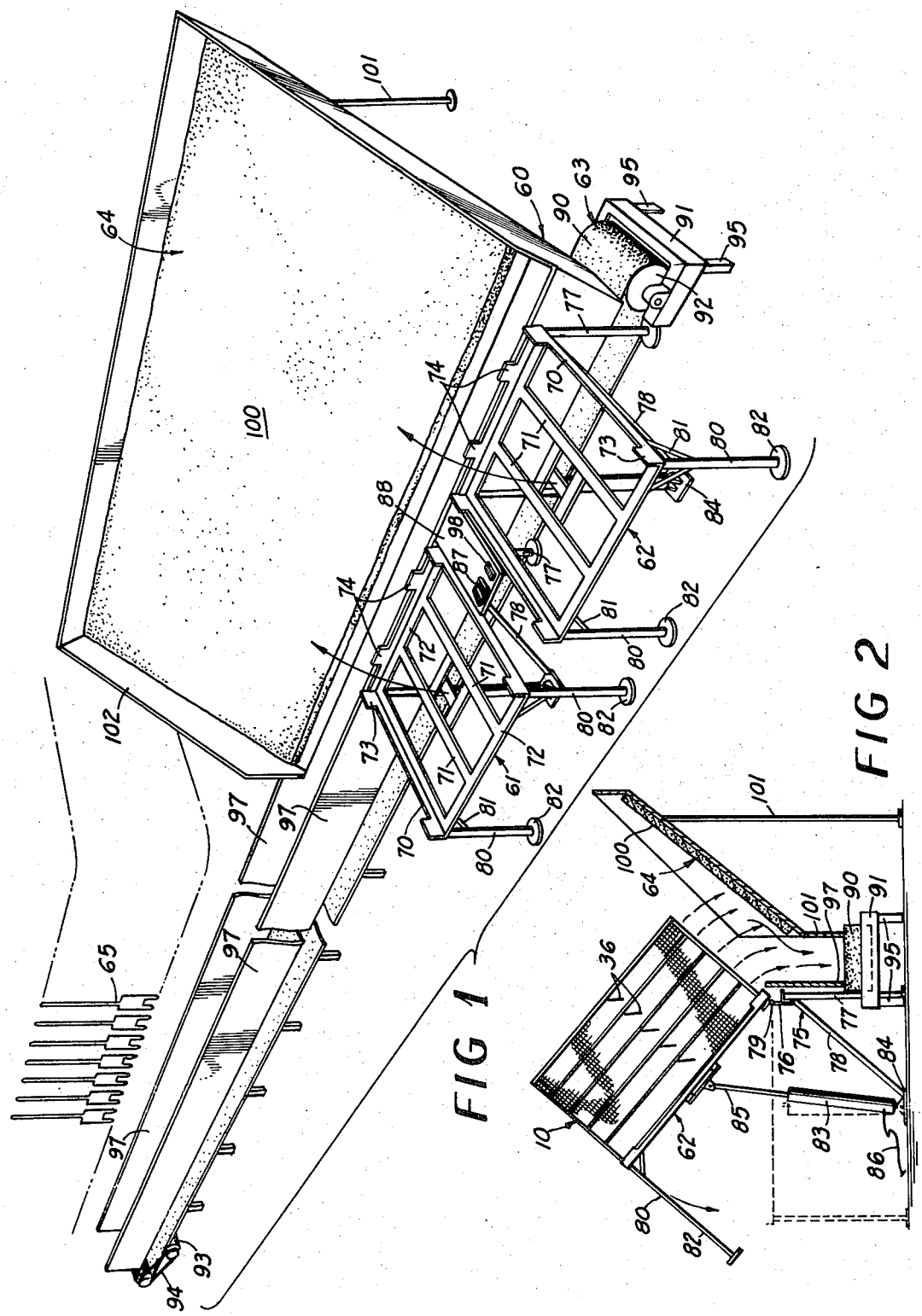

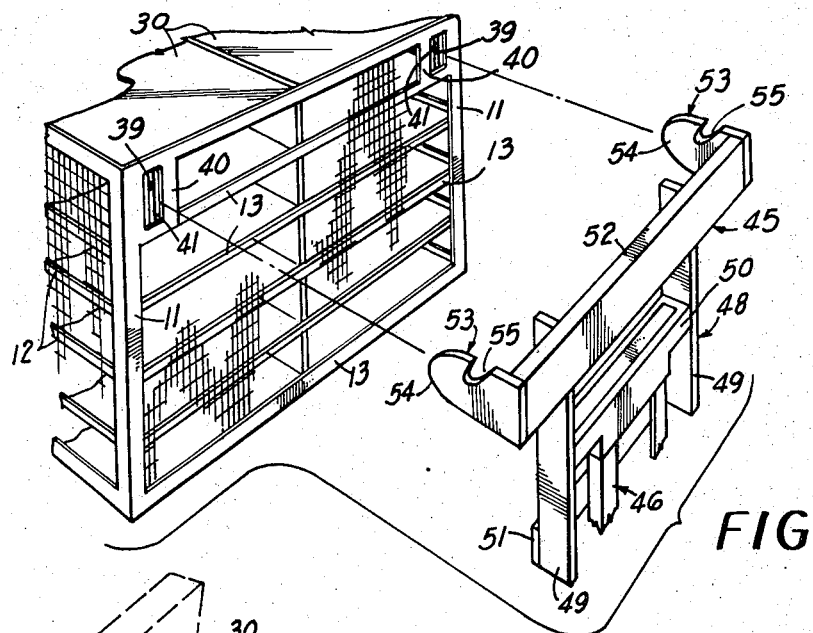
FIG 5
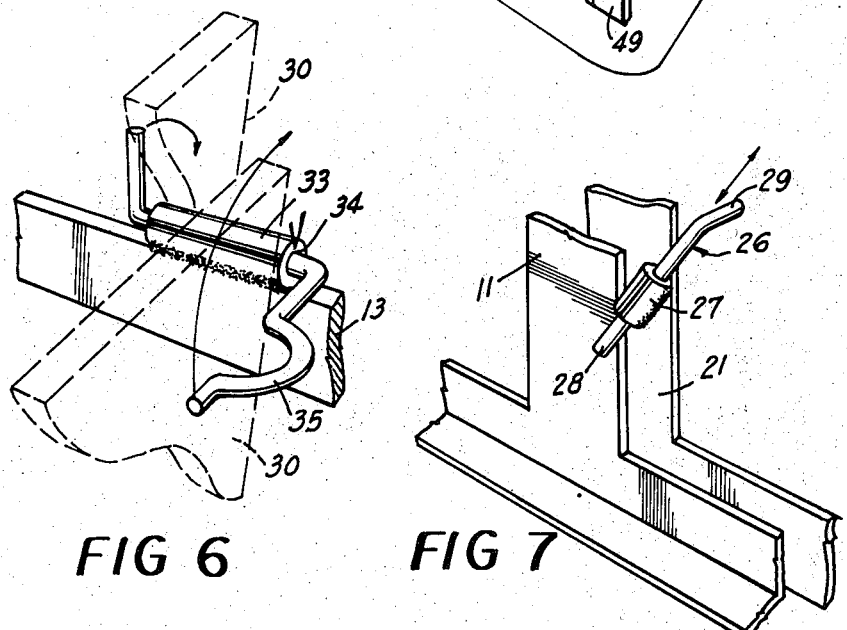
FIG 6  FIG 7
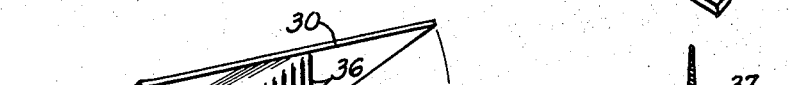
FIG 8  FIG 9

POULTRY HANDLING SYSTEM

This is a division of application Ser. No. 107,771 filed 1-19-71.

BACKGROUND OF THE INVENTION

This invention relates to a method and apparatus for handling poultry or other fowl to be processed. More particularly, this invention includes a container means for effecting a transfer of poultry from a growing operation to the processing operation and includes a receiving station for transferring the poultry from the container means to the processing operation.

Poultry to be used in a processing operation is grown at facilities remote from the processing plant, such as broiler houses which are located at various scattered farms. Poultry grown in the broiler houses are transferred to the processing operation by housing a number of birds in small wooden crates, transferring a number of these wooden crates with poultry by vehicular means from the farm to the processing plant.

In the processing of poultry, the bird is usually suspended head down from a shackle which travels along an overhead conveyor to those locations at which various processing operations are performed. Therefore, the poultry must be transferred from the wooden crate transport means to the shackle suspension means.

In the past, the wooden crates containing a number of birds was placed on a conveyor system which would be conveyed along a predetermined path adjacent a conveyor system provided with the shackle suspension means. A number of operators would manually remove the birds from within the crates and transfer the birds to the shackle suspension means. Most modern processing plants have a very high production rate and, as a result of this production rate, an excessive number of operators were required to effect the transfer of the poultry from the wooden crates onto the shackle suspension system. After the birds had been removed from the wooden crates, the crates were conveyed by conveyor means to a remote area where another operator would again stack the crates on a transport vehicle means.

One problem with the prior art method of transporting and transferring poultry from the transport crate means to the processing means would be the excessive number of operators required to maintain the production rate of the processing facility.

Another problem with the prior art wooden crate method of transporting poultry to a processing plant would be that a number of the birds would be smothered and dead on arrival at the processing plant. These smothered birds could not be used and therefore loss of the value of the smothered birds would accumulate daily in a processing operation.

Still another problem of the prior art wooden crate transport system would be the manual labor required to effect a transfer and stacking of these wooden crates onto the vehicle transfer means. Due to the excessive amount of handling of these wooden crate means, the crates would become damaged and must be replaced frequently, increasing the cost of the transfer system utilizing the wooden crate method.

An additional problem of the prior art wooden crate system would occur at the broiler houses where the poultry was loaded in the individual crate. The loading of birds into these individual crates and the loading of these crates on a transfer vehicle means required an excessive amount of manual labor.

SUMMARY OF THE INVENTION

It is therefore a primary object of this invention to provide an improved method and apparatus for effectively transferring poultry from a growing facility to a processing plant.

Another object of this invention is to provide container means for use in housing and transporting poultry from a growing operation to a processing plant.

A further object of this invention is to provide a transport container means in which poultry can be transferred therefrom by gravity.

Still another object of this invention is to provide a container means which is effective for transferring poultry from a growing operation to a processing operation without smothering poultry being transported thereby.

A still further object of this invention is to provide an improved poultry transport container means which is effective for housing and transporting a large number of birds.

Yet another object of this invention is to provide an improved poultry transport container means having a number of accessible compartment means.

Another object of this invention is to provide a poultry receiving station which will effectively and satisfactorily receive and transfer poultry from one location along a predetermined path to a second location.

A further object of this invention is to provide a poultry receiving station which will effect a transfer by gravity of poultry housed in a transport container means.

A still further object of this invention is to provide an improved poultry receiving station which will effectively and satisfactorily receive and transfer poultry from a first location along a predetermined path to a second location without rendering damage to the poultry.

Still another object of this invention is to provide an attachment for use on an operable lift means for effecting a transfer of a container means from one location to a second location.

An additional object of this invention is to provide an improved method and apparatus for effecting a transfer of poultry from a growing operation to a processing operation which is simple in construction and operation, economical to manufacture and reliable in operation.

The above stated objects are obtained and disadvantages of the prior art are overcome by the present invention which basically includes an improved container means operable for effecting a transfer of poultry from the growing operation to the processing operation. The improved container means includes a framework means having means surrounding a portion thereof to define an enclosed container area having an upwardly open entrance opening and a horizontally extending exit opening. Operable closure means is provided on the framework means for effecting a closure of the entrance and exit openings. The enclosed container area is provided with a number of divider means for dividing the container area into a number of vertically spaced housing compartments. The divider means and the exit opening closure means are detailed whereby poultry can be transferred from the compartment area through the exit opening by gravity means. An improved receiving station is provided at the poultry processing plant for receiving the container means The receiving station includes conveyor means for effecting a transfer of poultry from one location along a predetermined path to a second location adjacent poultry suspension means utilized in the processing plant. The receiving station includes power operable platform means for effecting a movement of the container means to a position whereby poultry housed in the compartment areas will be transferred through the exit opening by gravity onto the conveyor means. A padded guide means is operatively supported at the receiving station for absorbing impact of poultry deposited thereon and for guiding the poultry onto the operable conveyor means.

Still other objects and advantages of the details of construction will become apparent upon reading the following description of the illustrative embodiments of the invention with reference to the attached drawings wherein like reference numerals have been used to designate like parts throughout the several figures, and wherein:

BRIEF DESCRIPTION OF THE DRAWINGS

FIG. 1 is a perspective view of the receiving station employed in the present invention;

FIG. 2 is an end elevational view of the receiving station illustrating one of the platform support members in an adjusted position;

FIG. 5 is a fragmentary exploded perspective view of the container means and a transport attachment therefor;

FIG. 6 is an enlarged fragmentary perspective view of a retaining latch utilized in the container means of the present invention;

FIG. 7 is an enlarged fragmentary perspective view of a latch means for the closure gates;

FIG. 8 is a perspective illustration of one of the divider members used in the container means; and FIG. 9 is an enlarged perspective view of one of the flexible divider elements shown secured to the bottom of the divider member of FIG. 8.

GENERAL DESCRIPTION

Figure 3:
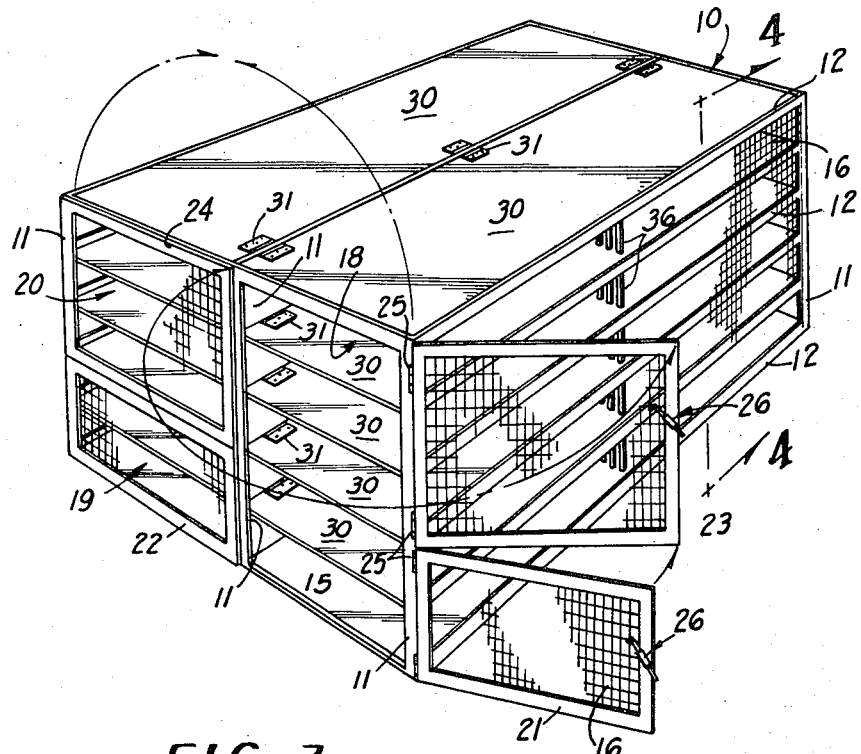
FIG. 3 is a right front perspective view of a container means utilized in the present invention with two of the closure gates moved to an opened position.

Referring now to the drawings, the improved method and apparatus of the poultry handling system of the present invention will be described with reference to a container means 10, a transport attachment means 45 and a receiving station 60.

The function of the container means 10 is to provide an improved transport means for housing and transporting poultry from a growing facility to a processing plant. The function of the transport attachment 45 is to provide an effective means for moving container 10 from a first location to a second location. The function of the receiving station 60 is to provide a means located at a processing plant for receiving poultry transported thereto from a growing facility, transferring poultry from the transport containers 10 and moving the poultry along a predetermined path to a position adjacent conventional shackle suspension means located within the poultry processing plant.

CONTAINER MEANS

Figure 4:
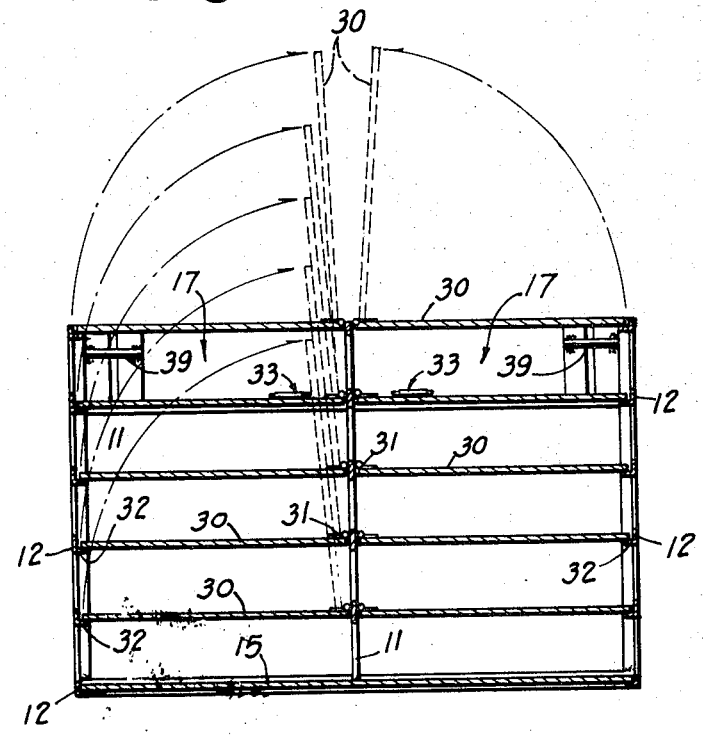
FIG. 4 is a vertical sectional view taken along lines 4—4 of FIG. 3.

Referring now particularly to FIGS. 3 and 4, the container means includes a framework structure having a number of vertically extending posts 11. Posts 11 are connected together in a vertically oriented horizontally spaced position by a number of vertically spaced horizontally oriented longitudinally connecting beams 12 and a number of vertically spaced horizontally oriented transverse connecting beams 13 (FIG. 5). The structural framework posts 11, beams 12, 13 are of conventional means, such as welding.

As shown in FIGS. 3 and 4, the container 10 includes a floor structure 15, with the framework provided with a conventional wire mesh covering 16 surrounding the two sides and one end to define a cavity area having an upwardly open entrance opening 17 and a horizontally extending exit opening 18. The cavity storage area of the container 10 is divided into two horizontally spaced storage areas by means of a number of longitudinally extending beams 12 extending midway through said container 10 and connected to a vertically extending post 11 supported intermediate the sides of the container. Wire mesh means 16 is provided on the intermediate wall for sealing the area between the two horizontal storage areas.

The horizontally extending exit opening 18 is divided into a lower opening 19 and an upper opening 20. The lower opening 19 is provided with a pair of lower gate means 21, 22 for effecting a closure of the openings to maintain poultry within the storage areas. The upper exit opening 20 is provided with an upper pair of closure gate means 23, 24 for effecting a closure of the space above the lower gate means. The gates 21-24 are supported by conventional hinge means 25 on vertical posts 11 for operable swinging movement from an open position which will expose the exit openings 18 to a closed position in which the exit openings are sealed to maintain poultry within the container storage areas.

Each of the gate means 21-24 is provided with a latch element 26 operable for releasably latching the gates in their closed position. Latch 26 includes a sleeve 27 connected to the gate in a downwardly inclined position by conventional means, such as welding. An operable plunger element 28 is supported for sliding movement within sleeve 27 whereby a lower extended end of the plunger will engage in inward surface portion of the intermediate vertically extending posts 11 to maintain the gates in their latched or closed position. Plunger 28 is provided with handle means 29 adjacent upper edge thereof for effecting movement of the plunger to an unlatched position. The sleeve 27 is angularly oriented relative to a vertical axis whereby plunger 28 will move by gravity from an unlatched position to a latched position. The gate structures 21-24 are detailed in design to present an unobstructed area to the exit opening 18, when the gates are moved to their unlatched open positions.

As shown in FIGS. 3 and 4, the container 10 is divided into a number of vertically spaced storage compartments by a plurality of horizontal divider members 30. The horizontal divider members 30 are detailed in dimensions to completely fill the area between the intermediate wall, side wall, exit opening and closed end when the dividers are supported in a horizontal operable position therein. Each of the dividers is supported at predetermined vertically spaced location on the intermediate framework beam members 12 by conventional hinge means 31 whereby the dividers can be pivoted from an upwardly extended inoperable position, as shown in FIG. 4, to a horizontally oriented operable position, as shown in FIG. 3. Dividers 30 are supported in their horizontally oriented operable position by horizontal flange 32 formed on the longitudinal beams 12. The flanges 32 are detailed in dimension to provide the supporting base for dividers when the dividers are in a supported horizontal operable position but will permit movement of the dividers to an upwardly swung inoperable position.

The dividers 30 are held in an upwardly swung inoperable position by means of a releasable latch means 33. The releasable latch means 33 includes a control arm 34 pivoted on the framework at 35 and includes a formed operable end for engaging an under side of the divider members to support them in an upwardly swung inoperable position. The horizontal spaced storage areas are each provided with dividers 30 and a separate latch means 33 is provided on the separate framework in each of the storage areas for holding and maintaining the dividers in their upwardly swung inoperable position.

As shown in FIGS. 8 and 9, each of the dividers is provided with a plurality of downwardly extending flexible elements 36 supported transversely across the underside of the dividers, substantially intermediate the ends thereof. The flexible divider elements 36 are pivotally attached by conventional screw means 37 to the underside of the dividers 30 whereby divider elements will automatically swing to an inoperable position when the dividers 30 are swung upwardly to an operable position. The flexible elements 36 are detailed in pivotal mounting where they will swing to an upwardly extended inoperable position to permit poultry on the dividers to be transferred by gravity through the exit opening, as will be described in more detail herein below in the description of the operation of the system. Flexible dividers 36 are provided for separating the vertically spaced storage compartments into two horizontally spaced compartment areas and to prevent poultry contained in the compartment areas from congregating adjacent one end thereof, to prevent smothering of the poultry in a transport operation. As shown in FIG. 3, the extreme upper divider 30 will serve as a closure means for the upwardly extending entrance opening.

As shown in FIG. 5, container 10 is provided with a number of support members 39 detailed for receiving a transport attachment to effect a transfer of container 10 from one location to a second location. Support members 39 are fixed to the framework means adjacent the upward closed end of the container. The support members 39 are horizontally spaced and aligned and are supported between vertical posts 11 and a short vertically extending element 40, extending between two of the transverse beams 13. The short vertical element 40, posts 11 and transverse beams 13 will define an entrance opening for receiving a transport attachment, as will be described in more detail herein below. Entrance opening 41 is provided with a pair of flexible closure means 42 connected to vertical posts 11 and vertical element 40, respectively, for effecting an automatic opening and closure of the opening 41 in response to the transport attachment being inserted therethrough or removed therefrom.

TRANSPORT ATTACHMENT MEANS

Referring now particularly to FIG. 5, a transport attachment means 45 is provided for attachment to conventional operable vertical lift frame means (not shown) and for cooperation with the support members 39 of the above described container 10 for effecting a transfer of container 10 from one location to a second location. The transport attachment means 45 is detailed to be supported on a conventional fork lift vehicle frame means 46. The lift frame means 46 includes conventional power operable means (not shown) for moving the lift frame means to an upwardly displaced position. Transport attachment 45 includes an attachment frame 48 having two vertically extending frame members 49. Vertically extending frame members 49 are connected together intermediate their ends by a cross connecting downwardly extending channel-shaped member 50. The cross connecting downwardly extending channel-shaped member 50 is detailed for cooperation with the upper end portion of frame means 46 for facilitating attachment thereto. Vertically extending frame members 49 are also provided with a cross connecting member 51 which is detailed to be in abutting engagement with a front surface of the lift frame means 46. The upper extended ends of the vertical frame members 49 are joined together by a cross connecting attachment member 52. A pair of forwardly projecting support elements are connected to opposite ends of the cross connecting member 52. The forwardly projecting support elements 53 are detailed to include a rounded tip portion 54 adjacent an extended end thereof and an upwardly opened notch means 55. The upwardly opened notch means 55 of each of the forward projecting elements 53 are in horizontal alignment with each other. Upwardly opened notch means 55 are detailed in dimensions to readily receive the support members 39 of the above described container 10. Operational engagement of the support attachment 45 with container 10 will be described in more detail herein below in the description of the operation of the poultry handling system.

RECEIVING STATION

Referring now particularly to FIGS. 1 and 2, the receiving station 60 includes a pair of platform container receiving means 61, 62, conveyor means 63, poultry guide means 64 and processing shackle suspension means 65.

The function of the pair of platform container receiving means is to provide a support surface for receiving the above described transport container 10. The platform receiving means are operable for effecting movement of container means 10 to a transfer position for transferring poultry from within container 10 onto the conveyor means 63. The function of the conveyor means 63 is to effect a movement of poultry deposited thereon from one location along a predetermined path to a second location adjacent the processing plant shackle suspension means 65. The function of the guide means 64 is to receive poultry being transferred by gravity from the container means 10 and to guide the poultry onto the conveyor means 63. The function of the processing plant shackle suspension means 65 is to provide a conveyor system for conveying poultry from the receiving station to various processing locations throughout the processing plant.

As shown in FIGS. 1 and 2, each of the platform container receiving means 61, 62 is provided with a supporting deck structure 70. The supporting deck structure 70 is constructed of a number of longitudinally extending frame members 71 and a number of transverse cross connecting frame members 72. The frame members 71, 72 are conventional metal stock material and are joined together adjacent their juncture by conventional welding means (not shown). Upwardly extending guide means 73 are provided along the lateral side edges of the support deck structure for guiding and maintaining a container 10 in a proper position thereon. Limit stop means 74 is located on a right edge of the support deck structure 70.

The support deck structures 70 are supported in a substantially horizontal receiving position by means of a stationary frame means 75 located adjacent one end. The stationary frame means 75 includes a horizontal beam 76 supported in a predetermined vertically spaced and horizontally oriented position by a number of vertically extending posts 70. Brace means 78 are provided for maintaining the stationary frame means 75 in an upright supporting position. Hinge means 79 is provided between the horizontal beam 76 and a right edge of the support deck structure 70 for pivotally connecting the supporting deck structure 70 to the stationary frame means 75. A left end of the support deck structure 70, as shown in FIGS. 1 and 2, includes a pair of vertically extending leg members 80 which are connected to opposite corners of the support deck structure 70 and maintained in properly vertically oriented position by means of brace means 81. A lower extending end of each of the legs 80 is provided with conventional shoe means 82 detailed for abutting engagement with a supporting surface for maintaining the support deck structure 70 in a horizontal aligned receiving position, substantially as shown in FIG. 1.

Movement of the support deck structure 70 from a receiving position, as shown in FIG. 1, to an angularly oriented dumping position (FIG. 2) is provided by means of a conventional hydraulic cylinder 83. Cylinder 83 is connected adjacent a lower end to a mounting plate 84. Mounting plate 84 is supported on a supporting surface by conventional means (not shown). Cylinder 73 includes a piston rod connected adjacent its extended end by conventional connecting elements to an underside of the support deck structure transverse connecting beam 72. Operation of the hydraulic control cylinders 83 are effected by supply lines which are connected to a conventional hydraulic pump means (not shown). Operation of the hydraulic cylinders 83 is controlled by manual control means 87 located adjacent an operator's platform 88. The operator's platform 88 is located intermediate the pair of platform receiving means 61, 62, as shown in FIG. 1.

As shown in FIG. 1, the receiving station conveyor means 63 includes an endless conveying member 90. Endless conveying member 90 is supported on conventional conveyor frame means 91 and by roller support elements 92. Conveying movement of the endless conveying member 90 is provided by means of a motor 93 through a conventional drive transfer means 94. The endless conveying member 90 is detailed to present a horizontally extending supporting surface which will receive poultry deposited thereon and will convey the poultry along a predetermined path to a second location.

The conveyor means 63 is supported in an operable receiving position adjacent the platform means 62, 63 by means of a number of vertical extending support posts 95. The conveyor means 63 is supported in the conveyor location wherein the upper receiving surface of the endless conveying member 90 will be horizontally spaced a slight distance below the hinge axis of the pair of platform receiving means. A side closure means is IS supported adjacent one lateral side edge of the conveyor means for maintaining poultry deposited thereon on the upper conveying surface during a conveying operation. Operation of the conveyor motor drive means 93 is effected by means of a conventional electrical circuit through manual control means 98 located at the operator's platform 88 and by conventional electrical control means 99 located adjacent the platform suspension means.

As shown in FIGS. 1 and 2, the receiving station guide means 64 includes an upwardly extending and outwardly directed padded supporting surface 100. The guide means 64 is supported by conventional support framework 101 adjacent an opposite lateral side edge of conveyor 63 from the platform means 61, 62. The upwardly extending padded surface 100 is provided with conventional resilient shock absorbing means such as a synthetic foam rubber material for receiving and absorbing the impact of poultry dropped thereon by gravity from the container means 10. A shield means 102 is provided around the edge portions of the guide means 64 for preventing poultry deposited on the guide means from escaping over an edge thereof. The guide means 64 is detailed in angular orientation relative to the conveying members 93 such that poultry deposited on the guide means will slide by gravity down the upwardly inclined surface 100 onto the upper surface of the endless conveying element 90.

As shown in FIG. 1, a conventional vibrator means 105 is supported on the conveyor support framework 91. The vibrator means 105 is provided with a manual control element 106 located adjacent the operator's platform 88. The vibrator means 105 is operated by conventional electrical power means (not shown). The function of the vibrator means 105 is to vibrate the conveyor means 64 whereby poultry deposited thereon will remain in a sitting position to prevent the poultry from trying to escape from the conveying surface of the conveyor and to prevent unwanted movement of the conveyed poultry relative to the surface of the conveyor wherever the conveyor means is stopped during the transfer operation. The operational details of the vibrating means will be described in more detail herein below in the description of the operation of the poultry handling system.

OPERATION

Prior to effecting a utilization of the poultry handling system of the present invention the receiving station 60, including platform receiving means 61, 62, conveyor means 63, guide means 64 are installed at a processing plant whereby the conveyor means 63 will convey poultry along a predetermined path adjacent the conventional shackle suspension means 65.

To begin a transfer operation of poultry from the growing facilities to the processing plant utilizing the method and apparatus of the present invention, the container means 10 are transported to the poultry growing facilities. At the poultry growing facilities, the container means 10 are conditioned for a loading operation by moving all of the divider members 30 to an upwardly extended inoperable position and effecting a latching engagement of the operable end 35 of latch 33 with the underside of the lowermost divider member 30, as shown in FIGS. 4 and 6. With all of the divider members in an upwardly latched inoperable position, the storage area of container 10 will be available through the upwardly directed entrance opening 17. A loading operation of poultry into the container is effected by manually depositing the poultry through the entrance opening 17 onto the base floor 15. After a sufficient amount of poultry has been placed on the base floor 15 to fill the area thereof, the bottom most or lower divider member 30 is released from the latch element 33 and allowed to drop to an operable horizontal support position with the outwardly extending edges thereon in abutted relationship with aligned flange 32. The releasable latch 33 is reengaged with the next adjacent divider member to maintain all the upwardly displaced divider members in an inoperable position. The next level or storage compartment of the container 10 is filled by placing poultry through the entrance opening 17 onto the divider 30. After the first divider or storage compartment is filled with a predetermined amount of poultry the next adjacent divider is moved to a horizontal support position.

The sequence of operation of filling the area of one storage compartment and lowering a next vertically displaced divider member 30 is repeated until each of the vertically spaced storage areas, separated by the divider members 30, are completely filled with a predetermined amount of poultry. The two horizontally spaced storage compartments of container 10, which are each provided with individual divider members 30, can be filled simultaneously by a number of operators or one side of the container can be completely filled and then the next side filled if the number of operators is limited.

In some filling operations of container 10, it is desirable to close the two lower gate members 21, 22 and fill the container bottom compartment area by inserting the poultry through the upper exit opening 20 until the first or lower storage compartment has been completely filled. After the first or lower storage compartment has been completely filled, the two upper gates 23, 24 are moved to a closed position and then poultry is placed in the remaining compartments through the upwardly extending entrance openings, as described herein above.

After a storage container 10 has been completely filled with poultry, a conventional fork lift vehicular means having the support attachment 45, described herein above, is utilized to move the container 10 from a location within the broiler house to a location on a transport vehicle means (not shown). In a transfer operation, a number of the containers 10 are filled with poultry as described herein above and placed on the transport vehicular means.

The vehicular means with transport containers 10 is then driven to a poultry processing plant having the above described receiving station 60. With the vehicle having the containers 10 located adjacent the receiving station 60, containers 10 are transferred from the vehicle to the platform means 61, 62 by means of a second fork lift truck means which is provided with a transport attachment 45. In connecting the support attachment 45 to the container 10, an operator on the fork lift truck will elevate the lift frame means 46 to an aligned position wherein the forward projecting support members 53 can be inserted through the openings 47 defined in container frame means 10. When the forwardly projecting support members 53 are inserted in a proper position, a further vertical movement of the lift frame means 46 will cause the container support members 39 to become engaged with the upwardly opened notches 55 provided on the transport attachment. With the notches 55 and support members 39 in connected relationship, the container 10 can be transferred from the support vehicle by a slight vertical extension of the lift frame 46 to disengage a bottom surface of container 10 from the supporting surface of the support vehicle. With the container 10 supported by the transport attachment 45 as described above, operation of the fork lift means can be effected to transfer the container 10 to a selected one of the pair of platform receiving means 61, 62.

After a container 10 has been placed on a selected one of the platform receiving means 61, 62 the fork lift truck operator can effect a transfer of a second container means 10 onto the second platform receiving means. While the fork lift operator is effecting a transfer of a second container 10, an operator located on platform 88 will open the gate members 21-24 and move them to an open position exposing the exit openings 18 and 19 to a position above the conveyor means 63. The operator on platform 88 will then effect operation of the manual control 87 to deliver a supply of fluid under pressure from the conventional hydraulic pump means (not shown) through supply lines 86 to the hydraulic cylinder 83. Operation of hydraulic cylinder 83 will effect movement of the support deck structure 70 about hinge axis 79 to angularaly orient the container 10 relative to the conveyor means 63. After the container means has been angularly oriented, an amount of poultry contained within the storage compartments and on the divider 30 will slide by gravity onto the guide means 64 and conveyor means 63. Poultry which is housed in the upper compartments is dropped onto the padded guide means 100 and will slide down the inclined surface of the padded guide means onto the conveyor means 63. The padded surface of the guide means will prevent bruising of the poultry during the transfer operation. Should a number of poultry remain in the storage compartments, an operator can vibrate the platform support structure 70 by jogging the manual control means 87 an amount to shake any poultry remaining therein onto the conveyor means 63.

Operation of the conveyor means 63 is effected by means of a first manual control switch means 97 located adjacent platform 88. Operation of conveyor means 63 will convey poultry deposited thereon along a predetermined path from a first receiving location to a second location adjacent the processing plant shackle suspension means. As poultry is moved into position adjacent the shackle suspension means, a number of operators located adjacent the shackle suspension means will pick up the poultry off the conveyor means 63 and place the legs of the poultry in the shackle suspension means 65 in a conventional manner. A second manual control means is provided adjacent the shackle suspension means 65 for starting and stopping the conveyor means 63 as required to keep an amount of poultry available for the operators to transfer onto the shackle suspension means.

Should the conveyor means 63 be stopped during the transfer process, vibrator element 105 can be activated by a manual control means 106 to cause a slight vibration of the conveyor means 63. A slight vibration of the conveyor means 63 will cause the poultry deposited thereon to stay in a sitting position which will prevent the poultry from becoming excited and attempting to escape from the conveyor means or from crowding into any one area thereof.

After a first container means has been emptied by the operator on platform 88, the fork lift truck operator can return the empty container to the vehicle transport means and a second container is placed thereon. The operation of emptying the containers by the fork lift operator and receiving station operator is continued until a transport vehicle has been completely unloaded.

It now becomes apparent that the above described illustrative embodiment of the poultry handling method and apparatus is capable of obtaining the above stated objects and advantages. It is obvious that those skilled in the art may make modifications in the details of construction without departing from the spirit of the invention which is to be limited only by the scope of the appended claims.

What is claimed is:

1. A container means for use in housing and transporting poultry or other fowl comprising, in combination:
   a. framework means;
   b. means carried by a portion of said frame work means for defining an enclosed container area having an upwardly open entrance opening and a side exit opening;
   c. operable closure means supported on said framework means for effecting a closure of said upwardly opened entrance opening; and
   d. operable closure means supported on said frame means for effecting a closure of said side exit opening;
   e. said container area defining a number of vertically spaced housing compartments; and
   f. movable divider means operatively supported on said framework means for movement from an operable position effecting a division of said container area into said number of vertically spaced housing compartments to an inoperable position wherein said area of said container means includes an upwardly open undivided space;
   g. each of said divider means includes downwardly extending divider elements for separating said vertically spaced compartments into a number of laterally spaced compartment areas, said divider elements being movable between operable and inoperable positions in response to said divider means being moved between said operable and inoperable positions.

2. A container means for use in housing and transporting fowl comprising in combination:
   a. a framework;
   b. means carried by said framework means for defining an enclosed container area having an upwardly open entrance opening and a side exit opening;
   c. a plurality of vertical hinge means carried by said framework;
   d. a plurality of dividers within said container respectively carried by said hinge means for individual pivotal movement between a laterally extending operative position effecting a division with the other divider so disposed of said container area into vertically spaced housing compartments to an inoperative upright extending position nested with and adjacent the other similar disposed dividers for providing an upwardly open undivided space;
   e. closure means carried by said framework means for selectively closing and opening said upwardly open entrance opening; and
   f. second closure means also carried by said framework means for independent movement between operative and inoperative positions to selectively close and open said side exit opening whereby when said second closure means is closed, said partitions each may be successively moved individually from its upwardly extending position to its operable position to close the compartment therebelow and provide a deck to receive said poultry or other fowl thereon, and when said dividers are in their operative position and contain poultry or other fowl and said second closure means is open, said container may be inclined toward said side exit opening for simultaneously urging the poultry or other fowl out of said side exit opening.

3. A container means as defined in claim 2 including divider elements respectively pivotally carried by said dividers for separating certain compartments into laterally divided compartments.

* * * * *